United States Patent Office 3,605,813
Patented Sept. 20, 1971

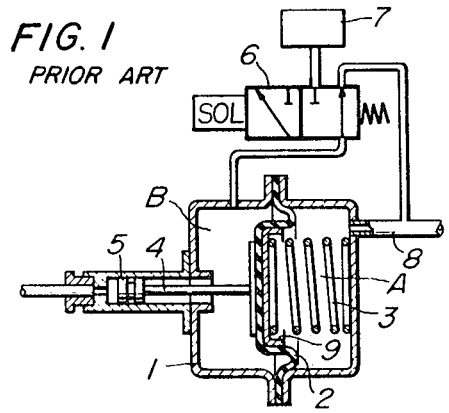
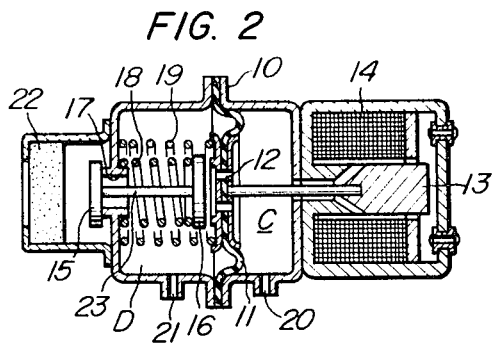
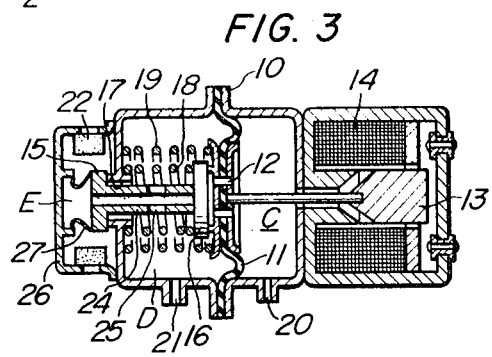
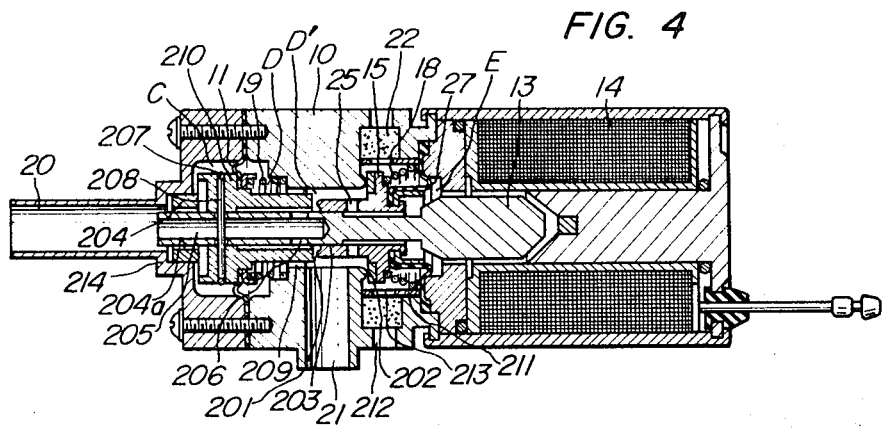

3,605,813
CONTROL VALVE MEANS OF THE NEGATIVE PRESSURE DIFFERENTIAL TYPE
Yoshiaki Nakano, Gifu-shi, Atutoshi Okamoto, Toyohashi-shi, Noriyoshi Ando and Koichi Taniguchi, Kariya-shi, and Koichi Toyama, Toyohashi-shi, Japan, assignors to Nippon Denso Company Limited, Kariya-shi, Japan
Continuation-in-part of application Ser. No. 814,937, Apr. 10, 1969. This application June 9, 1969, Ser. No. 831,651
Claims priority, application Japan, Apr. 10, 1968, 43/29,219; Aug. 29, 1968, 43/74,608
Int. Cl. F16k 11/24
U.S. Cl. 137—627.5                          7 Claims

ABSTRACT OF THE DISCLOSURE

Control valve means of the negative pressure differential type which is provided with a pressure comparing diaphragm mounted on a rod for operating valves, the valves being operated such that one of them is closed simultaneously when the other valve is opened, and the rod being operated by a solenoid. The negative pressure differential between a chamber on one side of the diaphragm and a chamber on the other side thereof can be controlled by maintaining balance between said negative pressure differential and a force exerted by said solenoid on a plunger. This control valve means has particular utility in an anti-skid mechanism for motor vehicles. In this application, the control valve means permits to control and maintain the braking hydraulic pressure at a predetermined level when the braking force is released by the anti-skid mechanism.

---

This is a continuation-in-part of application Ser. No. 814,937, filed Apr. 10, 1969.

The present invention relates to control valve means in general. In particular, the invention is concerned with control valve means of the negative pressure differential type adapted, for example, to be built into a hydraulic pressure controlling device of an anti-skid mechanism for motor vehicles for controlling and maintaining the hydraulic pressure in a controlled member at a predetermined level as in controlling the hydraulic pressure in the brake system of a motor vehicle by the hydraulic pressure controlling device when the braking force is released by the anti-skid mechanism.

The anti-skid mechanism for motor vehicles generally includes a hydraulic pressure controlling device which is adapted to increase or reduce the braking hydraulic pressure and generally constructed such that it is actuated by a negative pressure in the intake manifold of the vehicle engine. The hydraulic pressure controlling device having a known control valve built thereinto operates such that the hydraulic pressure in the brake system is reduced to zero when the braking force is released by actuation of the control valve. However, it is not necessary to reduce the hydraulic pressure to zero in this operation. On the contrary, reducing the hydraulic pressure to zero has the disadvantage of increasing the stopping distance, which is not desirable.

The present invention obviates the aforementioned disadvantage of the hydraulic pressure controlling device of the anti-skid mechanism having a conventional control valve. Accordingly, the invention has as its object the provision of control valve means of the negative pressure differential type adapted to be used with the hydraulic pressure controlling device for a controlled member controlled by hydraulic pressure for maintaining the pressure of said controlled member at a predetermined level without reducing the same to zero.

In one aspect of the invention, there is provided useful control valve means of the negative pressure differential type of simple construction, compact size and low cost, comprising a diaphragm, a first chamber disposed on one side of said diaphragm, a second chamber disposed on the other side of said diaphragm, said first chamber and said second chamber maintaining communication with each other through at least one port formed in said diaphragm, said first chamber communicating with a negative pressure source and said second chamber communicating with a controlled member, said second chamber being formed with an air inlet port for maintaining the chamber in communication with the atmosphere, a first valve element adapted to open and close said air inlet port of second chamber, a second valve element to open and close said port in said diaphragm, and a solenoid for operating said diaphragm such that the negative pressure differential between said first chamber and said second chamber can be controlled by a force produced by said solenoid, whereby the pressure in said second chamber communicating with the controlled member can be maintained at a predetermined level without being increased to the atmospheric pressure level.

In another aspect of the invention, there is provided useful control valve means of the negative pressure differential type of simple construction, compact size and low cost, comprising a diaphragm, a first chamber disposed on one side of said diaphragm, a second chamber disposed on the other side of said diaphragm, said first chamber and said second chamber maintaining communication with each other through at least one port formed in said diaphragm, said first chamber communicating with a negative pressure source and said second chamber communicating with a controlled member, said second chamber being formed with an air inlet port for maintaining the chamber in communication with the atmosphere, a first valve element adapted to open and close said air inlet port of said second chamber, a second valve element adapted to open and close said port in said diaphragm, a third chamber disposed opposite the second chamber communicating with the controlled member, with respect to the air inlet port and maintaining communication with the second chamber so as to remove a pressure differential applied to said first valve element for opening and closing the air inlet port, and a solenoid for operating the diaphragm such that the negative pressure differential between said first chamber and said second chamber can be controlled by a force produced by said solenoid, whereby the pressure in said second chamber communicating with the controlled member can be maintained at a predetermined level without being increased to the atmospheric pressure level.

Additional objects as well as advantages and features of the present invention will become apparent from the description set forth hereinafter when considered in conjunction with the accompanying drawings, in which:

FIG. 1 is a fragmentary sectional schematic view of a hydraulic pressure controlling device incorporating a known control valve;

FIG. 2 is a longitudinal sectional schematic view of one embodiment of the control valve means of the negative pressure differential type according to this invention;

FIG. 3 is a longitudinal sectional schematic view of another embodiment of the control valve means of the negative pressure differential type according to this invention; and FIG. 4 is a view of still another embodiment of the control valve means of the negative pressure differential type according to this invention using a solenoid of the suction type which shows a detailed construction.

To enable the invention to be better understood, a hydraulic pressure controlling device having a known control valve built thereinto will first be explained with reference to FIG. 1. In FIG. 1, 1 refers to a vacuum cylinder, 2 to a diaphragm, and 3 to a set spring. The set spring 3 which has a low spring constant and a large free length is mounted such that it has a high set pressure so that a force produced thereby may show a small variation depending on the stroke. The vacuum cylinder 1 is divided into two chambers A and B by the diaphragm 2. Connected at one end to the diaphragm 2 is a push rod 4 which is in contact with a hydraulic piston 5 at the other end. 6 refers to a control valve adapted to electromagnetically perform a switching operation. 7 is an air filter, and 8 is a negative pressure conduit connected to the intake manifold of the vehicle engine. Said control valve 6 operates such that it normally permits the chamber B to maintain communication with the intake manifold of the vehicle engine through the negative pressure conduit 8 when it is not energized and permits the chamber B to communicate with the atmosphere through the air filter 7 when it is actuated to perform a switching operation. The chamber A is also maintained in communication with the intake manifold of the vehicle engine through the negative pressure conduit 8. 9 is a stopper for restricting the displacement of the diaphragm 2.

In the operation of the hydraulic pressure controlling device having the conventional control valve as aforementioned, a braking force release signal is produced by a control circuit of an anti-skid mechanism (not shown) to energize the control valve 6. Energization of the control valve 6 results in introduction of air through the air filter 7 into the chamber B so that atmospheric pressure prevails in the chamber B. The pressure differential between the chambers A and B causes the diaphragm to move to the right in FIG. 1 against the biasing force of the spring 3 till its movement is checked by the stopper 9. This rightward movement of the diaphragm 2 causes the hydraulic piston 5 to move rightwardly too till the hydraulic pressure in the brake system is reduced to zero. In other words, energization of the control valve 6 in the aforementioned construction results in the pressure in the chamber B being increased to the atmospheric pressure level at all times, with the diaphragm 2 moving rightwardly and the hydraulic pressure in the brake system being reduced to zero.

As stated previously, reduction of the hydraulic pressure in the brake system to zero when the braking force is released by the anti-skid mechanism after the brake is applied has the disadvantage of increasing the stopping distance. Accordingly, the provision of a new type of control valve means which permits to maintain the pressure in the chamber B at a predetermined negative pressure level without increasing the same to the atmospheric pressure level has been a problem for one skilled in the art to obviate.

The present invention obviates this problem by providing control valve means of the negative pressure differential type of novel construction which eliminates the aforesaid disadvantage of the known control valve 6 shown in FIG. 1. The invention will now be explained with reference to preferred embodiments illustrated in FIGS. 2 to 4.

In FIG. 2, a casing 10 is divided by diaphragm 11 into two chambers C and D disposed on opposite sides of the diaphragm 11 and maintained in communication with each other through at least one port 12 formed in the diaphragm 11. Connected to the diaphragm 11 is a plunger 13 which is surrounded by a solenoid 14. Energization of the solenoid 14 operates the plunger 13. A first valve element or air inlet valve 15 is mounted for opening and closing an air inlet port 17 formed in the chamber D. A second valve element 16 is mounted for opening and closing said port 12 formed in the diaphragm 11. The two valve elements 15 and 16 are mechanically connected to each other by a rod 23. A return spring 18 is mounted in the chamber D and disposed between the second valve element 16 and the inner wall of the casing 10 so as to thereby urge the first valve element 15 to close the air inlet port 17. A set spring 19 is mounted in the chamber D and disposed between the diaphragm 11 and the inner wall of the casing 10. Normally, there is a predetermined clearance between the second valve element 16 and the diaphragm 11. A negative pressure inlet port 20 is formed in the chamber C of the casing 10 and connected to the intake manifold of the vehicle engine. A control pressure outlet port 21 is formed in the chamber D of the casing 10 and connected to a controlled member. An air filter 22 is mounted so as to purify air introduced from the atmosphere in the chamber D through the air inlet port 17.

The operation of the embodiment of the control valve means of the negative pressure differential type according to this invention constructed as aforementioned will now be explained. Normally, the component parts are in the state shown in the figure, with the chambers C and D being maintained in communication with each other so that a negative pressure prevails in each of the chambers. Upon energization of the solenoid 14, the plunger 13 is moved leftwardly as seen in FIG. 2 by an axially directed magnetomotive force produced in the solenoid 14. This causes the diaphragm 11 to move leftwardly or into the chamber D to be brought into contact with the second valve element 16, thereby closing the port 12 and shutting off the chambers C and D from communication with each other. Further leftward movement of the plunger 13 results in the second valve element 16, and the first valve element 15 connected thereto, moving leftwardly. This causes the air inlet port 17 to open, with the result that air is introduced from the atmosphere through the filter 22 into the chamber D. Since a negative pressure still prevails in the chamber C, the negative pressure differential between the chambers C and D exerts a force on the diaphragm 11 which tends to move the same rightwardly as seen in FIG. 2. If this force becomes larger than a force produced by the solenoid 14, then the diaphragm 11 is moved rightwardly and the first valve element 15 closes the air inlet port 17. It will thus be appreciated that the negative pressure differential between the chambers C and D and consequently between the chamber C and a chamber of the controlled member communicating with the chamber D can be controlled and maintained at a value which is determined by a force produced by the solenoid 14. It will readily be appreciated that the force produced by the solenoid can be varied as desired by adjusting the value of a current passed to the solenoid.

If the conventional control valve shown in FIG. 1 is replaced by the above-mentioned control valve means according to this invention so that the negative pressure inlet port 20 thereof is connected to the negative pressure conduit 8 of the hydraulic pressure controlling device shown in FIG. 1 which is connected to the intake manifold of the vehicle engine and the control pressure outlet port 21 is connected to the chamber B of the vacuum cylinder 1 shown in FIG. 1, then the pressure in the chamber B which is negative can be increased by energizing the control valve means according to this invention to a predetermined level which is below atmospheric pressure. It will thus be evident that the hydraulic pressure in the brake system of motor vehicles can be prevented from being reduced to zero if the control valve means according to this invention is used with the hydraulic pressure controlling device.

The embodiment of the invention shown in FIG. 3 will now be explained. Like reference characters designate parts in FIG. 3 similar to those in FIG. 2.

In this embodiment, a hollow rod 24 is used in place of the rod 23 of FIG. 2 to mechanically connect the first valve element 15 and the second valve element 16 together, said hollow rod 24 also serving to maintain the chamber D in communication with a chamber E which is disposed opposite the chamber D with respect to the air inlet port 17. A port 25 is formed in the hollow rod 24 to maintain the interior of the hollow rod 24 in communication with the chamber D.

26 is a casing in which the chamber E is formed, and 27 is a bellows for providing a seal to the first valve element 15 and the chamber E, the effective sectional area of said bellows 27 being equal to the area of the valve 15 brought into contact with the air inlet port 17 or the area of the opening of the air inlet port 17.

Let us consider the force acting on the solenoid 14 when the negative pressure differential between the chambers C and D of the embodiment of FIG. 2 having no chamber E is maintained at a value which is determined by a force produced by the solenoid 14. The force produced by the solenoid $F_S$ can be expressed by the following formula:

$$F_S = (P_C - P_D)S_D + P_D S_A$$

or $$F_S = (P_C - P_D)(S_D - S_A) + P_C S_A \quad (1)$$

where $P_C$ is the difference between atmospheric pressure and the pressure (below atmospheric pressure) of the chamber C; $P_D$ is the difference between atmospheric pressure and the pressure (below atmospheric pressure) of the chamber D; $S_D$ is the effective sectional area of the diaphragm 11; and $S_A$ is the area of the valve element 15 in contact with the air inlet port 17 or the area of the opening of the air inlet port 17. Since the value of $P_C$ is arbitrary, the value of the second member $P_C S_A$ of the right term of the above Equation 1 is not definite. However, if the value of said second member $P_C S_A$ of the right term can be disregarded relative to the value of the first member of the right term, the pressure differential $(P_C - P_D)$ between the chambers C and D will be equal to the value of the force produced by the solenoid. Stated differently, the pressure differential $(P_C - P_D)$ can be determined by the force produced by the solenoid. The area of the opening of the air inlet port 17 cannot be made too small in some applications of the control valve means of this invention. Therefore, if the value $P_C S_A$ in the Equation 1 is to be disregarded, then the effective sectional area $S_D$ of the diaphragm 11 must be made considerably large relative to the sectional area of the opening of the air inlet port 17 or $S_A$. This makes it necessary to increase the force produced by the solenoid 14 or $F_S$.

In the embodiment illustrated in FIG. 3, the pressure in the chamber D is maintained equal to the pressure in the chamber E because the hollow rod 24 maintains the two chambers in communication with each other through the port 25, so that no pressure differential is applied to the first valve element. Thus, the second member of the right term of the above Formula 1 is zero in value. Accordingly, the negative pressure differential between the chambers C and D can be made equal to a force produced by the solenoid 14. The construction of the embodiment shown in FIG. 3 permits to obtain a smaller size in the control valve means of the negative pressure differential type of this invention than that of the embodiment shown in FIG. 2.

As stated previously, the control valve means of the negative pressure differential type according to one aspect of this invention comprises a diaphragm, a first chamber disposed on one side of said diaphragm, a second chamber disposed on the other side of said diaphragm, said first chamber and said second chamber maintaining communication with each other through at least one port formed in said diaphragm, said first chamber communicating with a negative pressure source and said second chamber communicating with a controlled member, said second chamber being formed with an air inlet port for maintaining the chamber in communication with the atmosphere, a first valve element adapted to open and close said air inlet port of said second chamber, a second valve element adapted to open and close said at least one port in said diaphragm, and a solenoid for operating said diaphragm such that the negative pressure differential between said first chamber and said second chamber can be controlled by a force generated by said solenoid. The control valve means constructed as aforementioned offers the advantage of normally maintaining a controlled member at a negative pressure equal to that of the negative pressure source and also maintaining said controlled member at a predetermined pressure lower than the atmospheric pressure level when the control valve means of the hydraulic pressure controlling device is energized.

Further, since the negative pressure differential between the two chambers disposed on opposite sides of the diaphragm is controlled by a force produced by the solenoid in the control valve means of the present invention, it is possible to readily vary as desired a pressure supplied to the controlled member when the control valve means of the hydraulic pressure controlling device is energized by simply varying the value of a current supplied to the solenoid. The mechanism for adjusting the value of the current supplied to the solenoid is very simple in construction. The invention thus makes it possible to obtain an overall compact size in the control valve means for use with the hydraulic pressure controlling device and to reduce cost for fabricating the same.

Especially in the embodiment shown in FIG. 3, an additional chamber is provided in the control valve means of the negative pressure differential type in order to obviate application of a pressure differential to the second valve element for opening and closing the air inlet port, said additional chamber being disposed opposite the second chamber maintained in communication with a controlled member with respect to the air inlet port and maintaining communication with the second chamber. The provision of this additional chamber ensures that a negative pressure differential equal to a force generated by the solenoid is provided even if the effective area of the diaphragm is reduced. By virtue of this arrangement, the embodiment shown in FIG. 3 permits to obtain a smaller size in the control valve means of the negative pressure differential type according to this invention than the embodiment illustrated in FIG. 2.

The embodiment of the present invention shown in FIG. 4 will now be explained. This embodiment represents a construction of the valve means which is adapted to be incorporated in a hydraulic pressure controlling device for motor vehicles. A solenoid of the suction type is used to obtain a compact size. In FIG. 4, 201 refers to a vacuum valve section, 202 to an air valve section, and 203 to a portion of the valve 15 which is adapted to move in sliding motion with the plunger 13. A bearing portion 204 allows the sliding motion of the plunger 13 and is formed with a port 204a maintaining communication between the chamber C and the negative pressure inlet port 20. A valve 210 formed integrally with the diaphragm 11 is fixed to the plunger 13 by a pin 208 which is fixed by a spring ring 207. 209 is a cutout formed in the casing 10 for maintaining communication between chambers D and D'. The plunger 13 is formed with ports 205 and 206 for communicating the negative pressure inlet port 20 with the vacuum valve section 201. The casing 10 is formed with a port 212 and a filter keep 211 for keeping a filter 22 is formed with a port 213, said ports 212 and 213 serving to introduce air into the air valve section 202 from the atmosphere.

In operation, energization of the solenoid 14 by passing a current of a given value to the coil results in the solenoid providing a drawing force proportional to the value of the current so as to thereby move the plunger 13 rightwardly as seen in FIG. 4. The valve 15 is not opened by this rightward movement of the plunger 13 because of its sliding section 203, but the vacuum valve section 201 is closed and then the air valve section 202 is opened simultaneously. When the pressure in the chambers D and D' reaches a predetermined value, the diaphragm 11 produces a leftwardly directed force and causes the plunger 13 to move leftwardly. This results in the air valve section 202 being closed, whereby the negative pressure differential between the chambers C and D and consequently between chamber C and such a control chamber of the controlled member, as indicated at B in FIG. 1, can be controlled and maintained at a level that can be determined by a force produced by the solenoid. Thus, the controlled negative pressure differential and the biasing force of the spring 3 in the hydraulic pressure controlling device balance, and the diaphragm 2 remains stationary in its position.

From the foregoing description, it will be appreciated that the control valve means of the negative pressure differential type according to this invention is admirably suited for use in a hydraulic pressure controlling device of an anti-skid mechanism of motor vehicles in which the aforementioned performance is desired.

What we claim is:

1. Control valve means of the negative pressure differential type comprising a casing, a diaphragm disposed in said casing, a first chamber disposed on one side of said diaphragm, a second chamber disposed on the other side of said diaphragm, said first chamber and second chamber maintaining communication with each other through at least one port formed in said diaphragm, said first chamber communicating with a negative pressure source and said second chamber communicating with a controller member, said second chamber being formed with an air inlet port for maintaining the chamber in communication with the atmosphere, a first valve element adapted to open and close said air inlet port of said second chamber, a second valve element integrally connected by a rod with said first valve element and adapted to open and close said port in said diaphragm, a third chamber disposed opposite the second chamber communicating with the controlled member with respect to the air inlet port and maintaining communication with the second chamber so as to remove a pressure differential applied to said first valve element and a solenoid for operating the diaphragm such that the negative pressure differential between said first chamber and said second chamber can be controlled by a force generated by said solenoid.

2. Control valve means of the negative pressure differential type comprising a casing having a diaphragm provided within the inner space of the casing to divide said inner space into first and second chambers disposed on opposite sides of said diaphragm respectively, said diaphragm being provided with at least one port for allowing said first and second chambers to communicate with each other, said first chamber being adapted to communicate with a negative pressure source, said second chamber being adapted to communicate with a controlled member and being formed with an air inlet port for allowing said second chamber to communicate with the atmosphere, a first valve element adapted to open and close said air inlet port of said second chamber, a second valve element adapted to open and close said port of said diaphragm; means for placing each of said first and second valve elements in position relative to each other and relative to the associated port so that one of said valve elements opens one of said ports associated therewith simultaneously when the other valve element closes the other port associated therewith, a solenoid for actuating said diaphragm so that said port of said diaphragm is closed by said second valve element when said solenoid is energized, said solenoid being operable to control the negative pressure differential between said first and second chambers by allowing said first valve element to close said air inlet port and simultaneously allowing said second valve element to open said port of the diaphragm in response to a predetermined negative pressure differential between said first and second chambers, and a third chamber disposed opposite to the second chamber with respect to said air inlet port thereof and communicating with the second chamber, said third chamber covering the whole surface of said first valve element facing said third chamber so as to remove a pressure differential applied to said first valve element.

3. Control valve means of the negative pressure differential type according to claim 1, wherein said rod is operable to push said diaphragm axially of said rod when said solenoid is energized.

4. Control valve means of the negative pressure differential type according to claim 1, wherein said third chamber is defined by a bellows extending between an inner wall portion of the casing and the surface of said first valve element on the side remote from said second chamber and air-tightly connected at the opposite peripheral edges thereof.

5. Control valve means of the negative pressure differential type comprising:

a casing having a negative pressure inlet port communicating with a negative pressure source, a control pressure outlet port communicating with a controlled member and an air inlet port communicating with atmosphere;

a solenoid having a plunger for actuating a first valve element slidably mounted thereon and also a second valve element fixedly mounted thereon;

a first diaphragm disposed within said casing and secured to said second valve element and an inner wall portion of said casing at the opposite peripheral edges thereof respectively so as to define on the opposite sides thereof first and second chambers respectively, said first chamber communicating with said negative pressure inlet port and said second chamber communicating with said control pressure outlet port, said first and second chambers being adapted to communicate with each other through an opening provided in said second valve element;

biasing means for urging said first and second valve elements so as to cut off the communication between said second chamber and said air inlet port while allowing said second chamber to communicate with said first chamber;

said first valve element being operable to cooperate with said second valve element so as to cut off the communication between said first and second chambers and simultaneously allow said second chamber to communicate with said air inlet port when said solenoid is energized; and a second diaphragm disposed in said casing and secured to said first valve element and an inner wall portion of said casing at the opposite peripheral edges thereof respectively to define a third chamber on the side of said diaphragm opposite to said second chamber, said third chamber communicating with said second chamber through an opening provided in said first valve element, and said diaphragm having a surface sufficient to covering the whole surface of said first valve element on the side adjacent to said third chamber.

6. Control valve means of the negative pressure differential type according to claim 5, wherein said plunger of the solenoid is operable to pull said second valve element axially of said plunger when said solenoid is energized so that one end surface thereof is brought into contact with the opposed end surface of said first valve element to thereby move said first valve element together with said plunger axially thereof.

7. Control valve means of the negative pressure type according to claim 5, wherein said solenoid is of the type that the plunger is pulled when the solenoid is energized and is arranged within said casing at a position adjacent to said second diaphragm, said plunger having a first port extending axially of said plunger and a second port provided on the peripheral surface of said plunger and opening to said first port, said first and second ports of the plunger allowing said second chamber to communicate with said negative pressure inlet port while the solenoid is deenergized, and the slide surfaces of said first valve element and said plunger of the solenoid are contacted with one another in airtight condition to define a seal therebetween.

References Cited

UNITED STATES PATENTS 3,168,352   2/1965   Stelzer _____ 137—627.5X

FOREIGN PATENTS 959,936   10/1949   France _____ 137—627.5

CLARENCE R. GORDON, Primary Examiner

U.S. Cl. X.R.

303—20, 21